Aug. 10, 1937.　　　　　P. GILLI　　　　　2,089,915
ACCUMULATOR PLANT
Filed Feb. 24, 1936　　　4 Sheets-Sheet 1
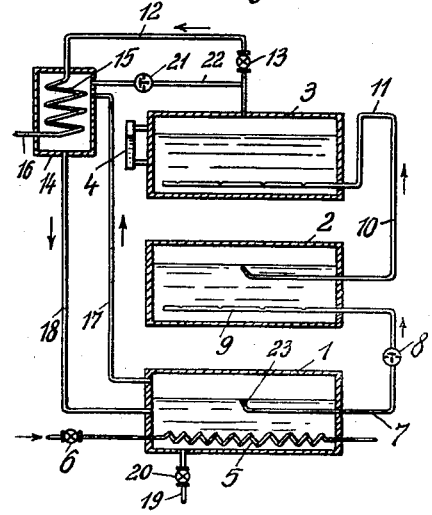
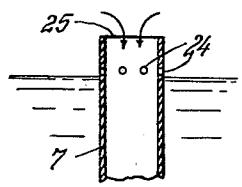
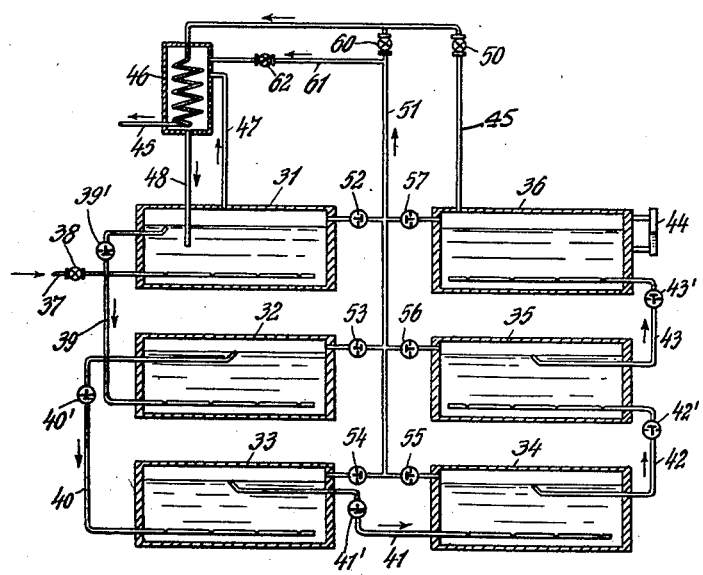
Inventor:
Paul Gilli
By Wm. J. Hedlund
his Attorney

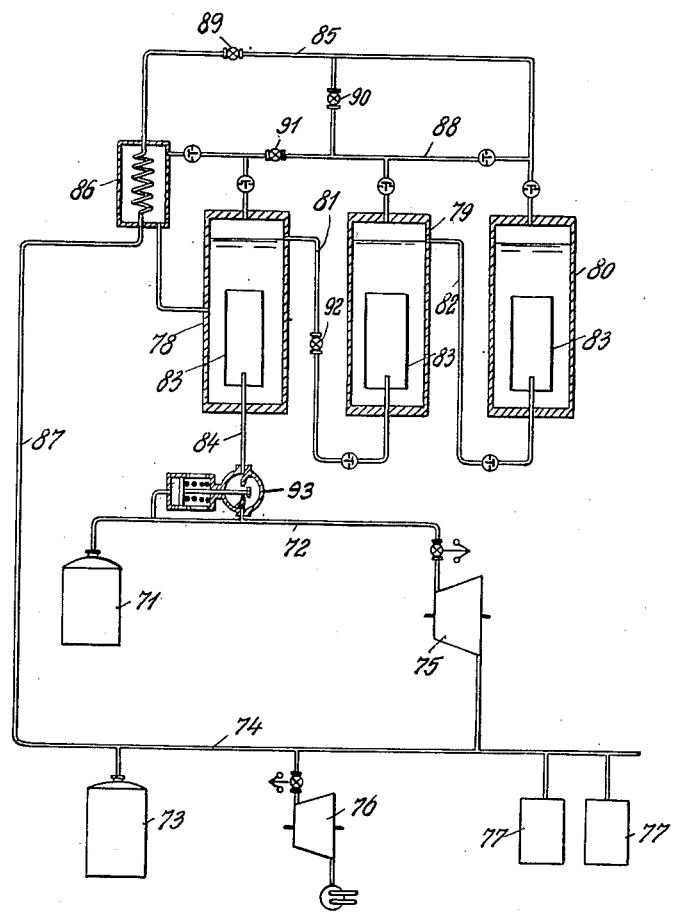

Aug. 10, 1937.  P. GILLI  2,089,915
ACCUMULATOR PLANT
Filed Feb. 24, 1936  4 Sheets-Sheet 3

Inventor:
Paul Gilli
By Wm J. Hedlund
His Attorney

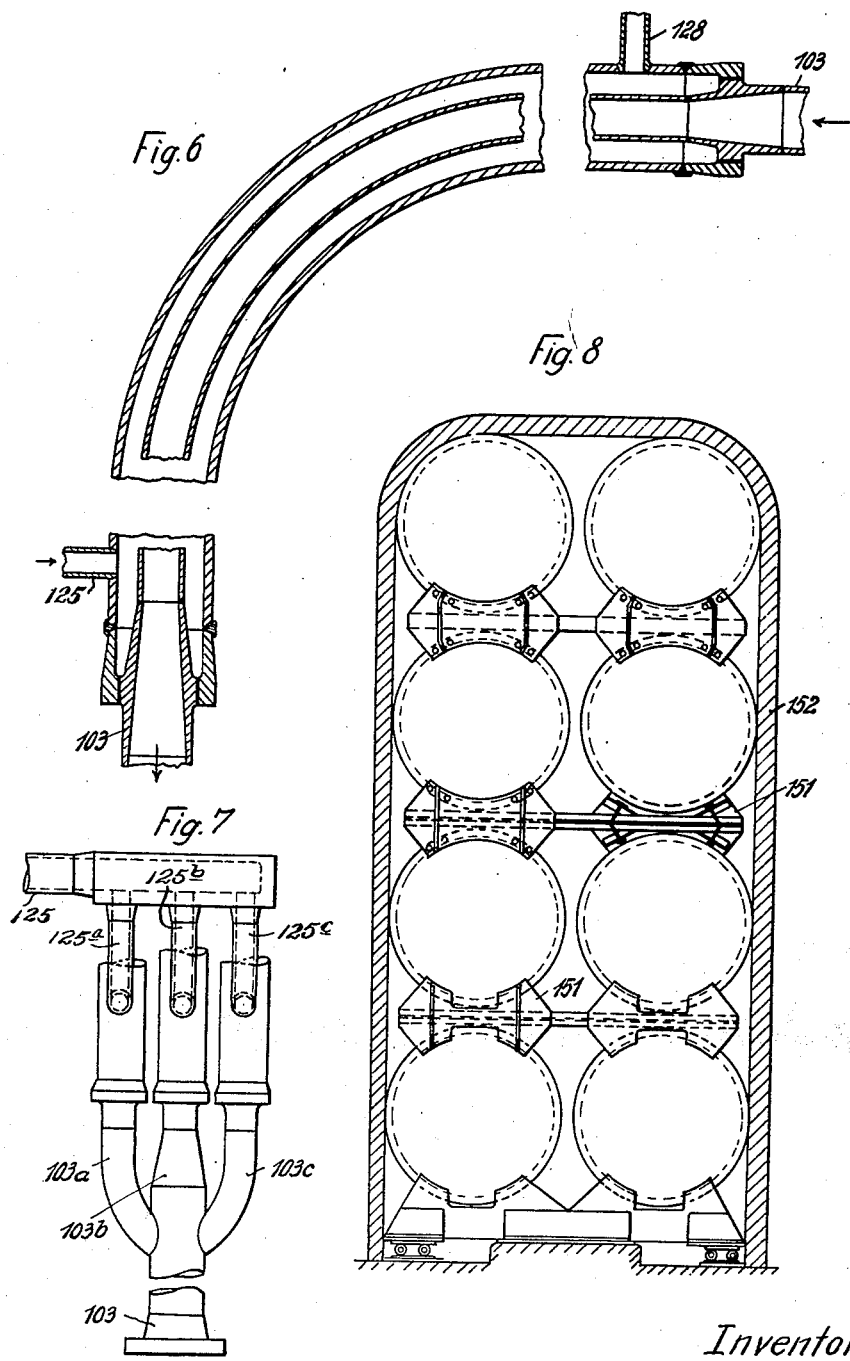

Patented Aug. 10, 1937

2,089,915

UNITED STATES PATENT OFFICE 2,089,915

ACCUMULATOR PLANT

Paul Gilli, Vienna, Austria

Application February 24, 1936, Serial No. 65,271
In Austria September 20, 1932

11 Claims. (Cl. 122—35)

My invention relates to accumulator plants. The object of my invention is to provide a novel and efficient accumulator plant which consists of several accumulator vessels and is more especially suitable for the accumulation of steam and water at very high pressures.

Further objects and the nature of the invention will appear from a consideration of the following specification taken in connection with the accompanying drawings showing several forms of steam plant arrangements embodying the invention, it being understood that these forms shown are for illustrative purposes and that the invention may be embodied in other forms.

In the drawings:

Fig. 1 is a more or less diagrammatic cross-sectional view of one embodiment of my invention;

Fig. 2 is a cross-sectional view of a modification of a portion of the apparatus shown in Fig. 1;

Fig. 3 is a more or less diagrammatic cross-sectional view of another embodiment of my invention;

Fig. 4 is a similar view of a third embodiment of my invention;

Fig. 6 is a cross-sectional view of a portion of the apparatus shown more diagrammatically in Fig. 5;

Fig. 7 is a view of a modification of the apparatus shown in Fig. 6; and

Fig. 8 is a view, partially in cross-section, of another portion of the apparatus shown more diagrammatically in Fig. 5.

Figure 5:
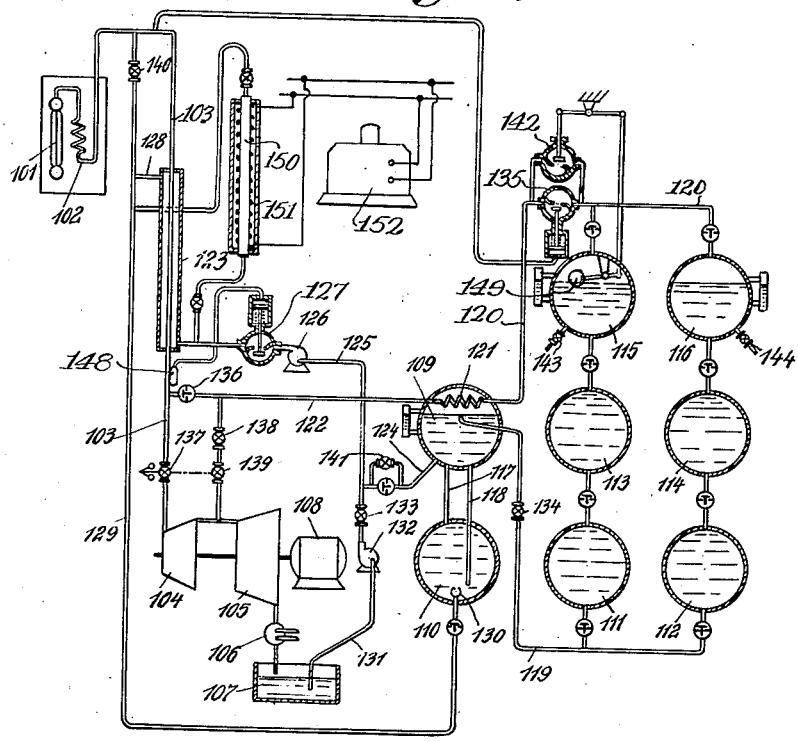
Fig. 5 is a more or less diagrammatic view, chiefly in cross-section, of a still further embodiment of my invention.

Referring to the drawings, Fig. 1 shows schematically an accumulator plant consisting of accumulator vessels 1, 2 and 3. All three accumulators are filled with water and are protected by insulation against heat losses. On container 3 a water gauge 4 is arranged. In the water space of accumulator 1 a spiral tube 5 is disposed through which flows highly superheated steam. The flow of steam through spiral tube 5 is regulated by valve 6.

Accumulator 1 is connected to accumulator 2 by a pipe 7 in which a check valve 8 is arranged. Pipe 7 begins at the height of the water level in accumulator 1 and terminates in the water space of accumulator 2. Pipe 7 has openings 9 through which steam can flow from accumulator 1 into the water of accumulator 2.

Accumulator 2 is connected to accumulator 3 by means of pipe 10 which at 11 is carried up above the water level in accumulator 3, thereby preventing flow of water from accumulator 3 back into accumulator 2.

A pipe 12, in which is arranged valve 13, connects with the steam space of accumulator 3 with a spiral tube 15 arranged in a container 14. From this spiral tube 15 steam flows through pipe 16 to the consumer (not shown).

The steam drawn from accumulator 3 and flowing through spiral tube 15 is superheated in container 14. For this purpose the superheater 14 is connected to the steam space of accumulator 1 by pipe 17, and by pipe 18 to the water space of accumulator 1.

Through pipe 19, in which is arranged stop valve 20, water can be supplied to accumulator 1, or can be drawn off. Pipe 12 is connected to superheater 14 by means of pipe 22 provided with back pressure valve 21.

The mode of operation of the plant is the following:

If heat is supplied to accumulator 1 through spiral tube 5, temperature and pressure in accumulator 1 rise. In consequence, steam, and if the water level in accumulator 1 is higher than the openings in pipe 7, also water, flows through pipe 7 into accumulator 2, thus causing temperature and pressure in accumulator 2 to rise also. Steam and/or water also flows to accumulator 3. Owing to the height of the water level above pipe 7 in accumulator 2 and owing to possible resistances in pipe 7, pressure and temperature in accumulator 1 are higher than pressure and temperature in accumulator 2. Likewise, pressure and temperature in accumulator 2 are somewhat higher than pressure and temperature in accumulator 3.

If accumulator steam is required, valve 13 is opened and steam flows from accumulator 3 through pipe 12 and superheater 14, thereby causing pressure and temperature in accumulator 3 to drop. In consequence thereof accumulator 2 also supplies steam to accumulator 3 through pipe 10.

From accumulator 1, steam flows through pipe 17 to the superheater 14. The resulting condensate flows through pipe 18 back into accumulator 1. Steam may also flow from accumulator 1 through pipe 7 into accumulator 2.

During discharge, pressure and temperature in the accumulator system fall, during charging, pressure and temperature rise.

In Fig. 2, entrance 23 of pipe 7 is shown in enlarged scale. Pipe 7 is carried above the water level and has several openings 24 at the height of the water level, through which water enters pipe 7 when the water level rises above the level of these openings. The steam flows in the direction of the arrows through upper opening 25. When the water level rises suddenly, for instance on sudden discharge of the accumulator, comparatively little water flows through opening 24 into pipe 7, while through opening 25 steam can freely enter.

The entrance of pipe 10 in accumulator 2 can be devised in the same way.

In Fig. 3, an accumulator plant is shown including six accumulators 31, 32, 33, 34, 35 and 36. Excess steam is charged through pipe 37 into the water space of accumulator 31. A valve 38 is provided in pipe 37. The various accumulators are connected with each other by pipes 39, 40, 41, 42 and 43. In the connecting pipes, back pressure valves 39', 40', 41', 42' and 43' are arranged. Thus the accumulators are connected in series for charging purposes. That is, the steam and/or water flows from accumulator 31 to accumulator 32, from accumulator 32 to accumulator 33, and so forth.

On the last accumulator 36, a water gauge 44 is provided. In the remaining accumulators such a water gauge is not required, as the entrance of the connecting pipes limit the water level in the various accumulators.

From accumulator 36 steam is drawn through pipe 45, the accumulator steam being superheated in superheater 46 which is connected to accumulator 31 by means of pipes 47 and 48. The withdrawal of steam is regulated by valve 50.

Apart from pipe 45, a second discharge pipe 51 is provided to which the various accumulators are connected in parallel by back pressure valves 52, 53, 54, 55, 56 and 57. When valve 60 is closed, the accumulators are discharged in series, that is, the steam flows through the connecting pipes 39, 40, 41, 42, 43 from one accumulator into the other, and from the last accumulator 36 into discharge pipe 45.

If valve 60 is opened, steam flows from all six accumulators, through back pressure valves 52, 53, 54, 55, 56, 57 into discharge pipe 51, and through valve 60 to superheater 46.

If the accumulator plant is discharged through pipe 45 only, the entire steam quantity must evaporate through the water surface in accumulator 36. During discharge of the accumulator plant through pipe 51, each accumulator supplies only about one sixth of the entire steam quantity. Thus, a sixfold water surface is available for evaporation.

When the accumulator plant is fully charged the accumulators 31, 32, 33, 34 and 35 may be completely filled, and in the first stage of the discharge period the accumulator plant is discharged only through pipe 45. When the accumulator pressure has sunk and a greater water surface has formed in the various accumulators, the accumulator plant may be discharged through pipe 51.

Superheater 46 is connected to pipe 51 by means of pipe 61 in which stop valve 62 is arranged. Superheater 46 is supplied with steam from accumulator 31 through pipe 47. If this steam is not sufficient for superheating, additional steam for superheating can be taken from the accumulator 32 or the following accumulators by opening valve 62.

In the plant illustrated in Fig. 4, high pressure boiler 71 supplies steam to a high pressure pipe 72, and low pressure boiler 73 supplies steam to low pressure pipe 74. Between the high pressure pipe and the low pressure pipe, back pressure turbine 75 is inserted. To low pressure pipe 74 are connected turbine 76 and further consumers 77. These consumers may, for instance, be a heating plant.

The accumulator plant consists of accumulators 78, 79 and 80, which are connected with each other through pipes 81 and 82. In the accumulators, tubular members 83 are provided to ensure a sufficient water circulation.

High pressure accumulator 78 receives high pressure steam through pipe 84 in which an overflow valve 93 is arranged. Valve 93 functions to open upon an increase in pressure in pipe 72 to admit steam to the accumulator, thus tending to maintain the pressure in pipe 72 constant.

The discharge pipe is designated by reference character 85. From here the steam flows through superheater 86 and pipe 87 into the low pressure pipe 74. Apart therefrom, a further discharge pipe 88 is provided. 89, 90, 91, 92 and 93 are regulating valves.

It is assumed that the pressure in the high pressure boiler and in pipe 72 is about 1700 lbs./sq. inch, and in low pressure pipe 74 approximately 300 lbs./sq. inch. The maximum pressure of the accumulator plant 78, 79, 80, is equal to the boiler pressure, that is 1700 lbs./sq. inch.

The mode of operation of the plant is as follows:

If there is surplus steam in pipe 72, overflow valve 93 is opened and the surplus steam flows into accumulator 78. Valve 92 is open during the charging period and therefore all three accumulators are charged simultaneously through pipes 84, 81 and 82.

If more steam is required in the steam plant than the boilers produce, discharge valve 89 is opened and steam flows from accumulator 80 through superheater 86 into low pressure pipe 74. Accumulator 79 thereby gives off steam to the accumulator 80. The steam required for superheating is drawn from accumulator 78. In the beginning of the discharging period, valve 92 is closed. By means of valve 89 the pressure of the accumulator steam, which at the beginning of discharge is high, is throttled. Therefore, the temperature of the steam on entering the superheater 86 is comparatively low and is increased again by means of steam from accumulator 78, the pressure of which as long as valve 92 is closed, is higher than the pressure in the other accumulators.

Since, on decrease of pressure, the specific volume of the steam increases from a certain pressure (for instance 700 lbs./sq. inch), it may be of advantage to withdraw steam direct from accumulators 79 and 80 simultaneously. To do this, valve 90 is opened so that accumulator 79 supplies steam to pipe 85. By opening valve 91, accumulator 78 can also supply steam to pipe 85.

The regulation of the plant may be effected by simple means, if desired automatically, for instance by governing overflow valve 93 by means of the pressure in pipe 72, and discharge valve 89 by means of the pressure in pipe 74.

The plant above described has the advantage that, owing to the great pressure drop from 1700 lbs./sq. inch to 300 lbs./sq. inch, as assumed in the example, a very large quantity of steam may be drawn from the accumulator plant. The accumulators constructed for the high pressure (in the present example 1700 lbs./sq. inch) have a comparatively great thickness of plates. For accumulators, forged drums of the kind used for high pressure boilers may be chosen. A large part of the heat to be accumulated is taken up by the shells of the high pressure accumulators. The shells themselves thus take part to a great extent in the accumulation, the capacity of high pressure accumulators being thereby increased, according to pressure conditions, for instance by 50% and more.

A further advantage consists therein that no alterations to the power engines of the plant are necessary, while in the known steam accumulators supplying steam to power engines, alterations for the steam entrance and in the regulation must be made.

In many cases it may be of advantage to lower the pressure in the low pressure line 74, which in the above example is assumed to be 300 lbs./sq. inch, even further, for instance down to 200 lbs./sq. inch. This makes it possible to discharge the accumulator even further and to draw still larger quantities of steam from the accumulator. The pressure in boiler 73 may thereby sink too, so that the accumulating capacity of the boilers can also be utilized. The lower limit down to which the accumulator pressure may be discharged below normal working pressure depends on what lowest pressure is permitted by the consumers fed by the accumulator plant. For additional discharge of the accumulator it is possible to lower the pressure to below normal working pressure in the case of part of the consumers only.

The modification shown in Fig. 5 represents the steam plant of an electric generating station. The boiler plant of the station is designated 101, and the superheater 102. The boiler supplies steam through pipe 103 to the turbine consisting of a high pressure section 104 and low pressure section 105. The condenser is designated 106, the condensate tank or hot well 107, and the generator 108. The accumulator plant consists of vessels 109, 110, 111, 112, 113, 114, 115, 116. Accumulator vessels 109 and 110 are connected by pipes 117 and 118. These pipes enable a circulation of the water to take place between the accumulators 109 and 110.

Accumulators 109, 115 and 116 are equipped with water gauges. The accumulator consisting of vessels 109 and 110 serves primarily for superheating the steam taken from vessels 115 and 116. A pipe 119 leads from accumulator 109 to the accumulator plant 111—116, which is divided in two parallel groups 111, 113, 115, and 112, 114, 116. Steam is taken from both groups by means of pipe 120 and is superheated in the spiral tube 121 arranged inside accumulator 109. The steam then flows through steam 122 into the main pipe line 103.

Part of the main steam line 103 is surrounded by an evaporator jacket 123. Pipes 124 and 125 lead from accumulator 109 to the lower part of the jacket 123. A pump 126 and a regulating valve 127 are inserted in pipe 125.

Pipes 128 and 129 lead from the upper part of jacket 123 to distributing pipe 130 arranged in accumulator 110. Pipe 131, in which pump 132 and throttling valve 133 are arranged, leads from feed water tank 107 to pipe 125.

The accumulator plant is charged in the following way:

Water is taken from accumulator 109 by means of pump 126 and is forced into jacket 123, through which main steam line 103 is carried. Boiler plant 101 and superheater 102 supply superheated steam. In this modification the boiler pressure is assumed to be 530 lbs./sq. in. and the steam temperature 850° F. The boiler steam flowing through the evaporator 123 transfers heat to the water fed into the jacket, thus causing it to evaporate. The temperature of the boiler steam is thereby lowered. The steam generated in evaporator 123, which can have a very high pressure of say 1700 lbs./sq. inch, due to the high temperature of the superheated steam in line 103, now flows by way of pipe 128 through pipe 129 into accumulator 110, thus heating the water content of both shells 109 and 110. During the charging period valve 134 is open. Steam, and under given circumstances also hot water, flows through pipe 119 into accumulator 111—116, thus charging the latter. In this way it is possible to charge the entire accumulator plant to a very high pressure corresponding to the temperature of the superheated steam in pipe 103.

The accumulator plant is discharged by opening valve 135. Steam then flows from accumulators 115 and 116 through steam line 122 into main pipe line 103. The pressure of the accumulator steam is throttled by means of valve 135.

During the discharging process, accumulators 111—114 also supply steam to the accumulators behind. When the accumulator plant is fully charged, accumulator shells 111—114 are completely filled with water. During the discharging period, part of the water in these tanks evaporates and a gradually falling water level results.

As valve 134 is closed at the beginning of the discharging period, accumulators 111—116 serve for supplying steam to the turbine, whereas accumulators 109 and 110 serve exclusively for superheating the accumulator steam by means of spiral tube 121. During the latter part of the discharging period, for instance at a pressure from 700 lbs./sq. inch down, valve 134 can be opened so that accumulator 109 and 110 can supply steam for the turbine through vessels 111—116.

The steam taken from the accumulator plant flows through back pressure valve 136 into main pipe 103, where it mixes with the steam from the boiler plant. The steam supply to the high pressure section 104 of the turbine is regulated by speed governor controlled valve 137. When the pressure of the accumulator plant has dropped to the pressure of main line 103, valve 138 is opened, through which accumulator steam can be led into the pipe connecting the high pressure section and the low pressure section of the turbine. The supply of accumulator steam is then regulated by the speed governor, which is connected to both valves 137 and 139, in such manner that with decreasing rotative speed valve 137 opens first and then valve 139.

In this case the accumulator plant can be discharged to below the pressure of the main pipe 103, down to the pressure in the low pressure section 105, for example 30 lbs./sq. inch.

The regulation of the steam supply to turbine sections 104 and 105 can also be carried out in such a way that valve 138 is opened before the accumulator pressure has dropped to the pressure in the main pipe 103. In this case supplementary steam can be fed into the turbine by means of governing valve 139, so that the output of the turbine can be increased.

Valve 140 permits heating the accumulated water to a temperature corresponding to the boiler pressure, by leading steam from the main pipe 103 directly through pipe 129 into vessel 110.

Water can be fed into the accumulator plant by means of pump 132 either by pumping the feed water into pipe 125 and through valve 133 (for instance during charging of the accumulator), or else directly through valve 141 into accumulator 109.

An automatic regulation of the plant can be effected by simple means, for instance in the following manner. Discharge valve 135 is governed like a reducing valve by the pressure in the main pipe line 103, so that valve 135 opens when the pressure in the main pipe 103 falls, and closes when the pressure increases.

Valve 138 can be governed in such a way that it opens as soon as the pressure in pipe 122 corresponds to the pressure in pipe 103.

Charging valve 127 can be governed by the temperature of the steam in pipe 103 behind evaporator 123. When this temperature increases beyond a certain degree, valve 127 is opened by the increase in pressure in thermostatic element 148 which is disposed in heat exchange relation with pipe 103 and water is fed into the jacket 123, thus drawing heat from the superheated steam and decreasing its temperature.

Valve 133 can be governed corresponding to the water level in accumulator tank 109 in such way that it opens when the lowest water level in the accumulator is reached, and it closes when the highest water level is exceeded.

In order to save unnecessary power consumption, the regulation of valves 127 and 133 can be effected by switching off the pumps 126 and 132 when these valves are closed, and not starting the pumps again until the valves commence to open.

The cooling-off losses of the accumulator plant can be covered in the following way. Valve 142 is arranged parallel to valve 135 and is governed corresponding to the highest water level in shells 115 and 116. When this highest water level is reached, valve 142 is opened somewhat by float 149 and allows steam to flow from the accumulator plant into pipe 122, even if regulating valve 135 should be closed. The heat content of the steam taken from the accumulator plant in this way is less than the heat content of the steam supplied to the accumulator plant by means of pipe 129. Thus surplus heat compensates the cooling-off losses.

When the accumulator is fully charged, that is when the highest pressure is reached in the accumulator plant, the firing of the boiler plant is reduced, as otherwise steam would be blown off through the safety valves.

The plant shown in Fig. 5 is specially suited to such power stations which must always have a reserve output at hand. Up till now in such plants reserve boilers were kept under fire in order that these boilers could in case of emergency immediately supply the steam necessary for the generation of the required power.

As the accumulator plant herein described can supply the required steam instantaneously, it is no longer essential to keep reserve boilers under fire, which results in a considerable saving in coal.

The arrangement of the evaporator in the main pipe 123 has the advantage that the regulation and control of the charging process is simplified considerably and the complications of the main pipe line are avoided.

Fig. 6 shows the construction of the evaporator more in detail.

It may be of advantage, in order to obtain a larger heating surface, to divide the main pipe 103 into several pipe lines, as shown in Fig. 7. Here steam pipe 103 is divided into three branches 103a, 103b and 103c. Pipe 125 through which the accumulator water is supplied to the jackets of the various steam pipe lines is also divided into three branches 125a, 125b and 125c.

Fig. 8 shows the mounting of the accumulator tanks. The tanks are fastened to each other by means of saddles 151, joining the entire accumulator plant into one unit. In this modification the accumulator plant is covered by a common layer of insulation 152.

A further advantage of the high pressure accumulator plant as compared with the already known low pressure accumulators is that it requires very little space to stand on.

The high pressure accumulator plant can also be applied with great advantage for the utilization of excess electric energy, such as is available at night in water power stations, for economic purposes. This may for instance be effected in such way that the steam for charging the accumulator vessels is produced in an evaporator 150 heated by a resistance coil 151 supplied with excess electric current from alternator 152. This evaporator may be erected on the side of the evaporator 123 and be connected in parallel with the latter. It is, however, also possible in such plants, to do without the evaporator 123 altogether and to charge the accumulator plant with the aid of the electrically heated evaporator 150 only.

Such power stations equipped with accumulator plants charged with electric current may be operated in such manner that the boilers during standby operation are not fired by fuel. Merely the turbine and the boiler plant are kept warm by means of steam from the accumulator plant, so that these parts can be placed in operation very quickly. Upon a sudden demand for current, the turbine is first fed from the accumulator alone and in the meantime the boilers are fired.

In connection with Fig. 5 it must be added that 143 and 144 indicate pipes through which water is introduced into the accumulators 115 and 116 or drawn off out of these accumulators.

I wish it to be understood that I do not desire to be limited to the exact details of the invention shown and described, for obvious modifications will occur to a person skilled in the art. The scope of my invention is to be limited only by the appended claims viewed in the light of the prior art.

Certain features, particularly of the embodiment shown in Figs. 5 through 8, not claimed herein, form the subject matter and are claimed in my copending divisional application Serial No. 152,290, filed July 7, 1937.

What I claim is:—

1. In an accumulator plant, a plurality of vessels, one of said vessels constituting an initial vessel and another of said vessels constituting a final vessel, means for charging said initial vessel, means for withdrawing steam from said final vessel, and conduit means connecting said vessels in series and providing an open path for uninterrupted flow of fluid between said vessels from said initial vessel to said final vessel while preventing flow of liquid between said vessels from said final vessel to said initial vessel at least during charging and discharging periods, so that steam spaces may form in the respective vessels on discharge, said conduit means connecting the steam space of one vessel with the water space of another vessel, the same said conduit means serving for unidirectional inter-flow between vessels on charging and similar unidirectional interflow between vessels on discharging, whereby the charge imparted to said initial vessel is distributed among said plurality of vessels through said conduit connecting means and said vessels are discharged simultaneously upon withdrawal of steam from said final vessel by flow through said conduit connecting means.

2. Apparatus as set forth in claim 1 including one way valve means in the conduit connecting means between vessels constructed and arranged to permit flow between said vessels from said initial to said final vessel while preventing flow of liquid between said vessels from said final vessel to said initial vessel.

3. Apparatus as set forth in claim 1 including one or more liquid traps in the conduit connecting means to permit flow between said vessels from said initial to said final vessel while preventing flow of liquid between said vessels from said final vessel to said initial vessel.

4. Apparatus as set forth in claim 1 in which the connection of the connecting means to one or more of the vessels at the point of withdrawal is below the vessel top to limit the water level and provide steam space therein.

5. Apparatus as set forth in claim 1 including means to supply make-up water to the initial vessel for all the vessels.

6. Apparatus as set forth in claim 1 including means to supply make-up water to the initial vessel for all the vessels and means to indicate the water level in the final vessel.

7. Apparatus as set forth in claim 1 having additional conduit means for discharging the vessels in parallel.

8. In an accumulator plant, a plurality of vessels, one of said vessels constituting an initial vessel and another of said vessels constituting a final vessel, means for charging said initial vessel, means for withdrawing steam from said final vessel, conduit means connecting said vessels in series and providing an open path for uninterrupted flow of fluid between said vessels from said initial vessel to said final vessel while preventing flow of liquid between said vessels from said final vessel to said initial vessel at least during charging and discharging periods, so that steam spaces may form in the respective vessels on discharge, said conduit means connecting the steam space of one vessel with the water space of another vessel, the same said conduit means serving for unidirectional interflow between vessels at least on charging, whereby the charge imparted to said initial vessel is distributed among said plurality of vessels through said conduit connecting means, and means to transfer heat stored in one of the vessels to steam withdrawn from a subsequent vessel in the line of series flow.

9. In an accumulator plant, a plurality of vessels, one of said vessels constituting an initial vessel and another of said vessels constituting a final vessel, means for charging said initial vessel, means for withdrawing steam from said final vessel, conduit means connecting said vessels in series and providing an open path for uninterrupted flow of fluid between said vessels from said initial vessel to said final vessel while preventing flow of liquid between said vessels from said final vessel to said initial vessel at least during charging and discharging periods, so that steam spaces may form in the respective vessels on discharge, said conduit means connecting the steam space of one vessel with the water space of another vessel, the same said conduit means serving for unidirectional interflow between vessels at least on charging, whereby the charge imparted to said initial vessel is distributed among said plurality of vessels through said conduit connecting means, means to reduce the pressure of steam withdrawn from one of the vessels, and means to superheat the steam at reduced pressure by heat stored in an earlier vessel in the line of series flow.

10. Apparatus as set forth in claim 1 including a superheater heated by the contents of the initial vessel, conduit means to conduct steam from the final vessel to the superheater, and pressure reducing means disposed in said conduit means.

11. Apparatus as set forth in claim 1, including a superheater, means to conduct steam from the initial vessel into heat exchange relation with the superheater, means to withdraw condensate from heat exchange relation with the superheater, a conduit for conducting steam from the final vessel, to the superheater, a throttling member in the last-mentioned conduit, and means to close the connection between the initial and final vessels to conserve the heat stored in the initial vessel for superheating.

PAUL GILLI.